A. S. LYMAN.
Apparatus for Condensing Milk.
No. 36,354.
Patented Sept. 2, 1862.
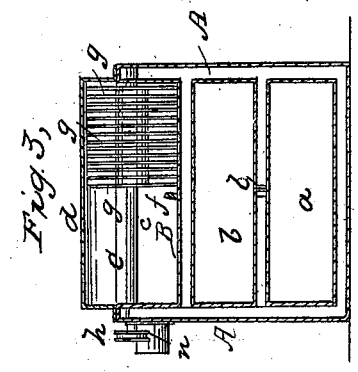
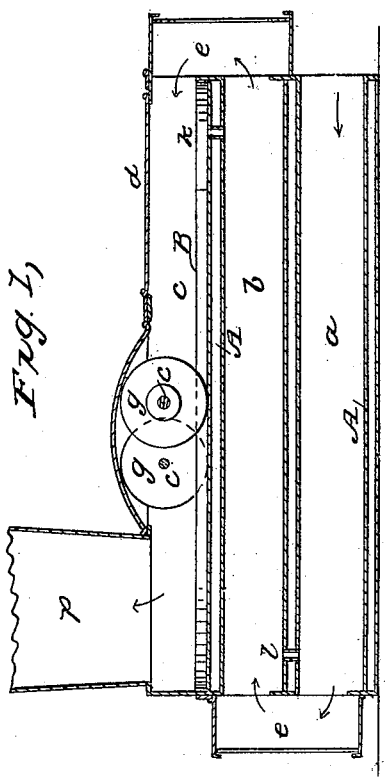
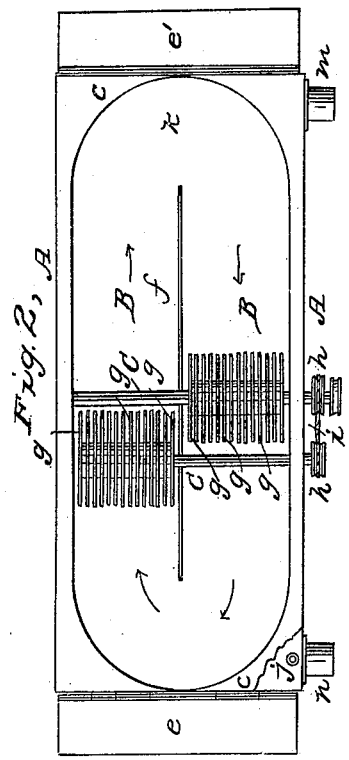
WITNESSES
INVENTOR:

UNITED STATES PATENT OFFICE.

AZEL S. LYMAN, OF NEW YORK, N. Y.

IMPROVED APPARATUS FOR CONCENTRATING MILK.

Specification forming part of Letters Patent No. 36,354, dated September 2, 1862.

*To all whom it may concern:*

Be it known that I, AZEL S. LYMAN, of the city, county, and State of New York, have invented a new and useful Improvement in Apparatus for Condensing Milk; and I do hereby declare that the following is a full, clear, and exact description of the same, reference being had to the accompanying drawings, forming part of this specification, in which—

Figure 1 is a longitudinal vertical section of an apparatus with my improvement applied. Fig. 2 is a plan of the same with the cover removed. Fig. 3 is a transverse vertical section of the same.

Similar letters of reference indicate corresponding parts in the several figures.

The object of my invention is to expose the milk for evaporation, distributed over a large surface, in contact with a large amount of fresh air, and at the same time to break up or prevent the formation of a pellicle; and to this end it consists in a series of disks rotating in a continuous trough arranged within a passage, through which there is a circulation of air.

To enable others to make and use my invention, I will proceed to describe it.

A is an oblong box or casing of any suitable dimensions, in which there are formed, one above the other, a series of horizontal, or nearly horizontal, flat-bottomed flues or passages, $a\ b\ c$, extending right through its ends. This box is intended to be filled with water at any suitable temperature, but preferably at about 160° Fahrenheit, and such water entirely surrounds the said flues or passages, except the top one, which is simply provided with a cover, $d$, the whole or any portion of which may be movable. These flues or passages are connected at opposite ends alternately by breechings $e\ e'$, so that constant circulation of air, either natural or forced, may be produced in them, entering the lower one at one end, which is open, and circulating from one to the next above it in opposite directions alternately, as indicated by black arrows in Fig. 2, and escaping from the upper one by an upright tube or chimney, $p$. At the bottom of the upper passage, $c$, there is formed a continuous trough, B, having parallel sides and semicircular ends, and having a central partition, $f$, extending the whole length of its straight sides, to enable the milk contained in the said trough to circulate continuously back and forth and round the ends of the said trough, as indicated by red arrows in Fig. 2.

C C are two horizontal shafts extending transversely through the upper air-passage, $c$, and working in bearings in the sides of the box, and each furnished with a number of concentric parallel disks, $g\ g$, of thin sheet metal, those on one shaft dipping into the trough B on one side of its partition $f$, and those on the other dipping thereinto on the opposite side of the said partition. The said shafts C C are geared together or connected by pulleys $h\ h$ and a band, $i$, in such a manner that rotary motion imparted to one causes the rotation of the other in the opposite direction.

$j$ is a pipe at the top of the uppermost passage, $c$, near one end thereof, for supplying milk to the trough B. Near the other end of the trough there is a pipe or opening, $k$, to allow the milk to run therefrom into the passage $b$ below, and near the opposite end of the said passage there is a similar pipe or opening, $l$, to allow the milk to run therefrom into the lower passage, $a$. In the breechings $e\ e'$ there may be holes for the passage of hoes or scrapers to scrape the milk from the bottoms of the passages $b$ and $c$, and the said breechings may be furnished with windows, through which the condition of the milk on the bottoms of the several passages may be examined.

$m$ is a pipe for the introduction of warm water to the box A continuously or from time to time, and $n$ is a pipe for letting off the water as it becomes cool.

The passages $a\ b\ c$ having been warmed by the surrounding water, and a circulation of air through them produced, the milk is introduced in suitable quantity into the trough B, and the shaft and disks are set in motion. The disks produce a threefold operation, viz: first, they take up the milk, and by their rotation cause it to be distributed over their surfaces, which in the aggregate are very extensive; and, second, they stir the milk in the trough and cause its circulation therein, as indicated by the arrows, and so keep changing its upper surface, which is presented to the air, by both of which operations they produce a rapid evaporation of the watery particles; third, they cut up the milk in such a manner as either to prevent the formation of a pellicle, or, if it commences forming, to prevent its forming to any considerable extent, and by that means also tend to expedite the evaporation, which is effected at a low temperature and without boiling. The milk partly condensed in the trough slowly descends through the pipe $k$ onto the bottom of the passage $b$, along which it flows slowly, and from whence it passes through the pipe $l$ onto the bottoms of the lowest passage, $c$, along which it circulates in the opposite direction, and from the open end of which it escapes into a suitable receptacle, the condensation being completed by the evaporation which takes place in $a$ and $b$, along both of which it flows in the opposite direction to that in which the air circulates.

What I claim as my invention, and desire to secure by Letters Patent, is—

The combination of the rotating disks $g\ g$, the continuous pan B, and the air-passage $c$, substantially as and for the purpose herein specified.

AZEL STORRS LYMAN.

Witnesses:
JAMES LAIRD,
RICHARDSON GAWLEY.